Sept. 18, 1956
H. SAHLIN
2,763,167
LOADING AND UNLOADING APPARATUS
Filed Aug. 8, 1952
4 Sheets-Sheet 1
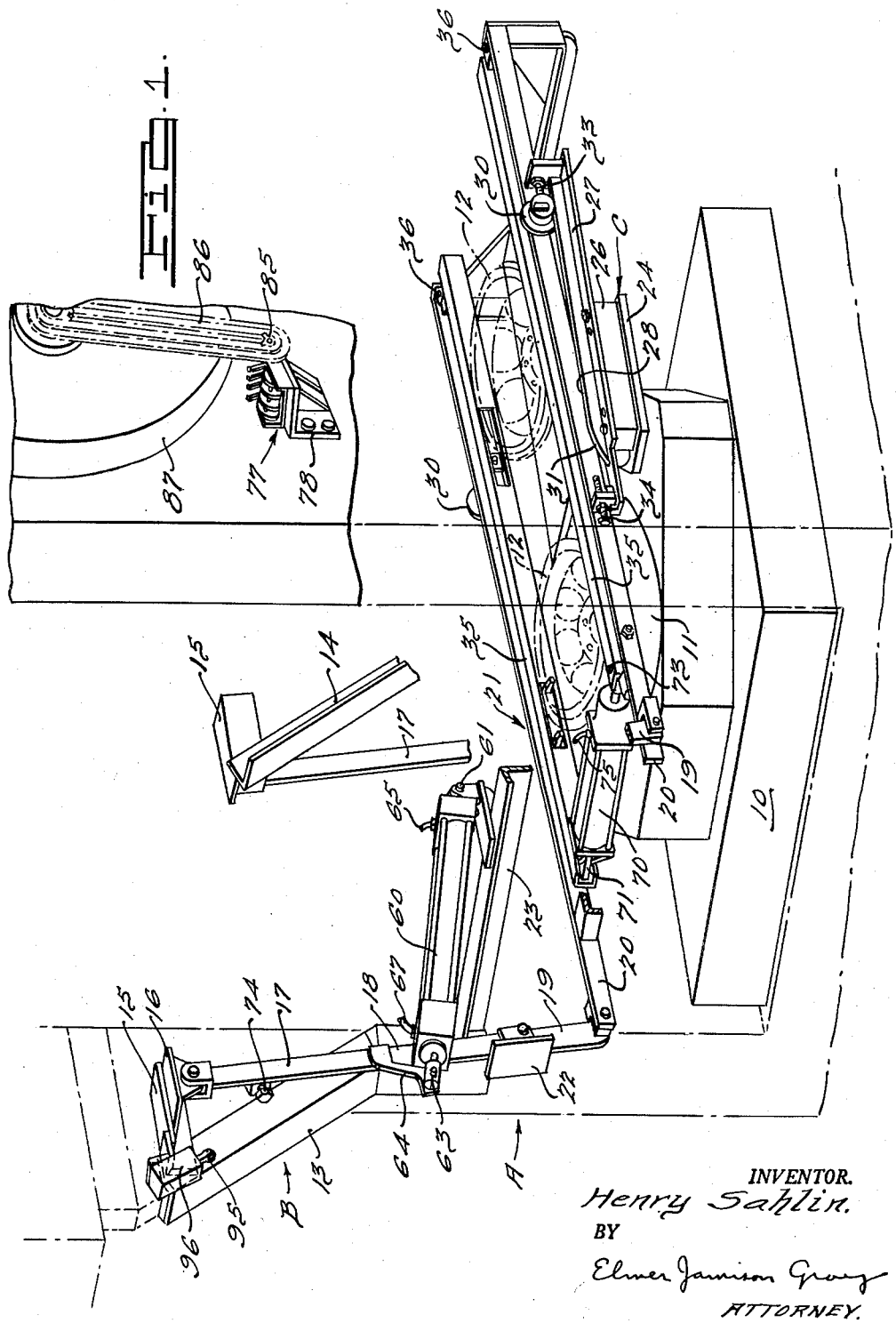
INVENTOR.
Henry Sahlin.
BY
Elmer Jamison Grove
ATTORNEY.

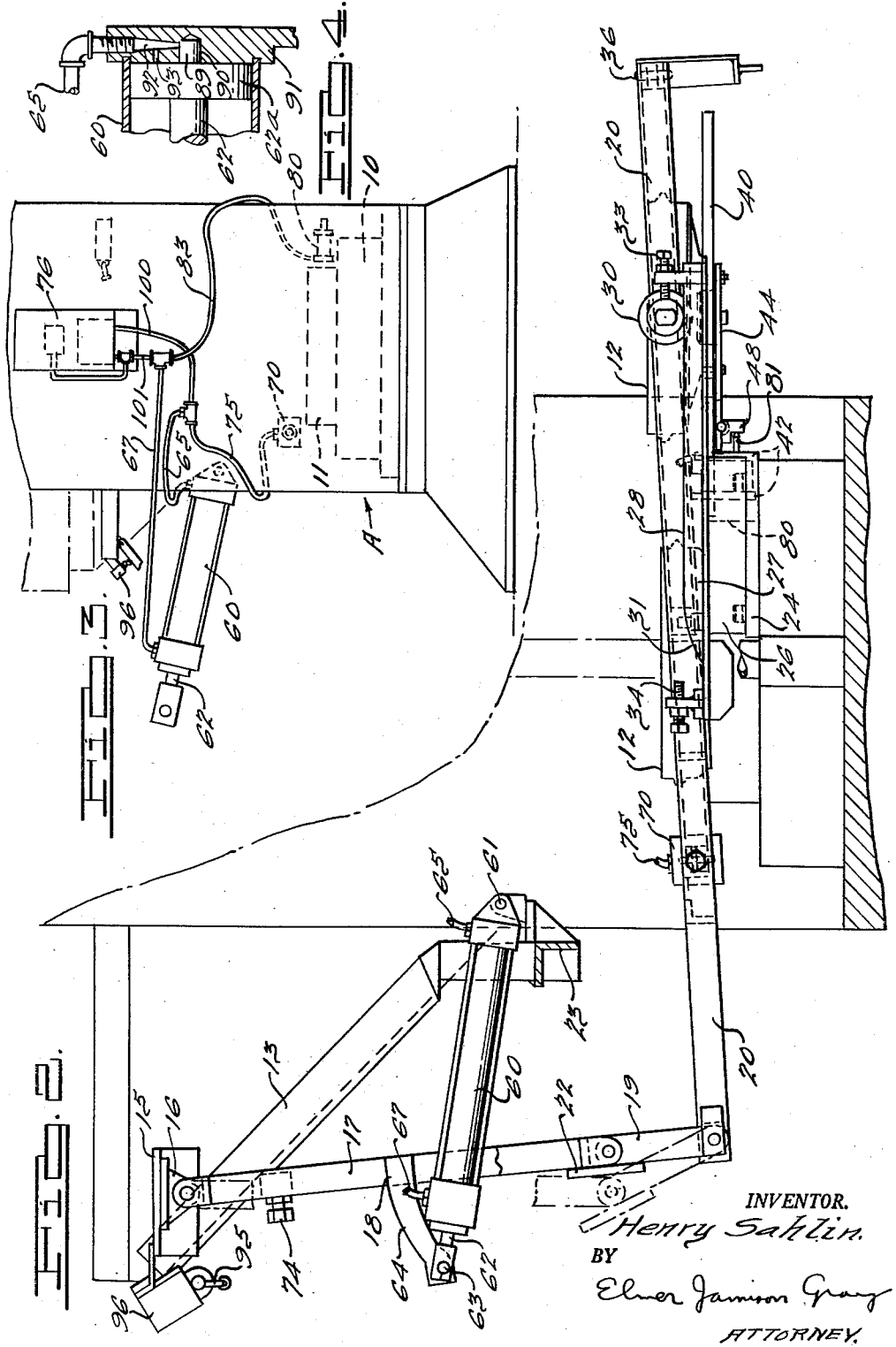

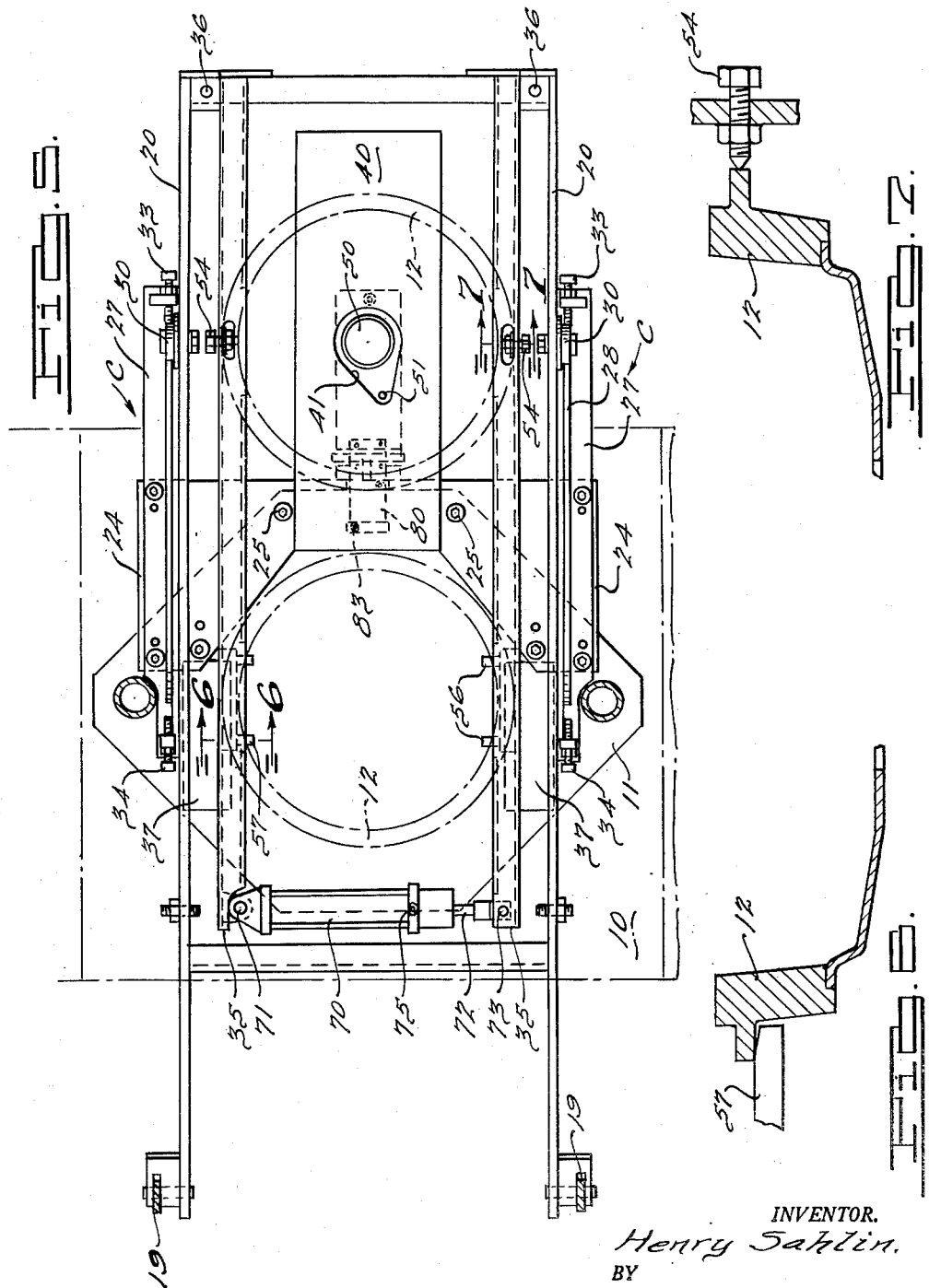

Sept. 18, 1956                H. SAHLIN                2,763,167
                       LOADING AND UNLOADING APPARATUS
Filed Aug. 8, 1952                                4 Sheets-Sheet 4
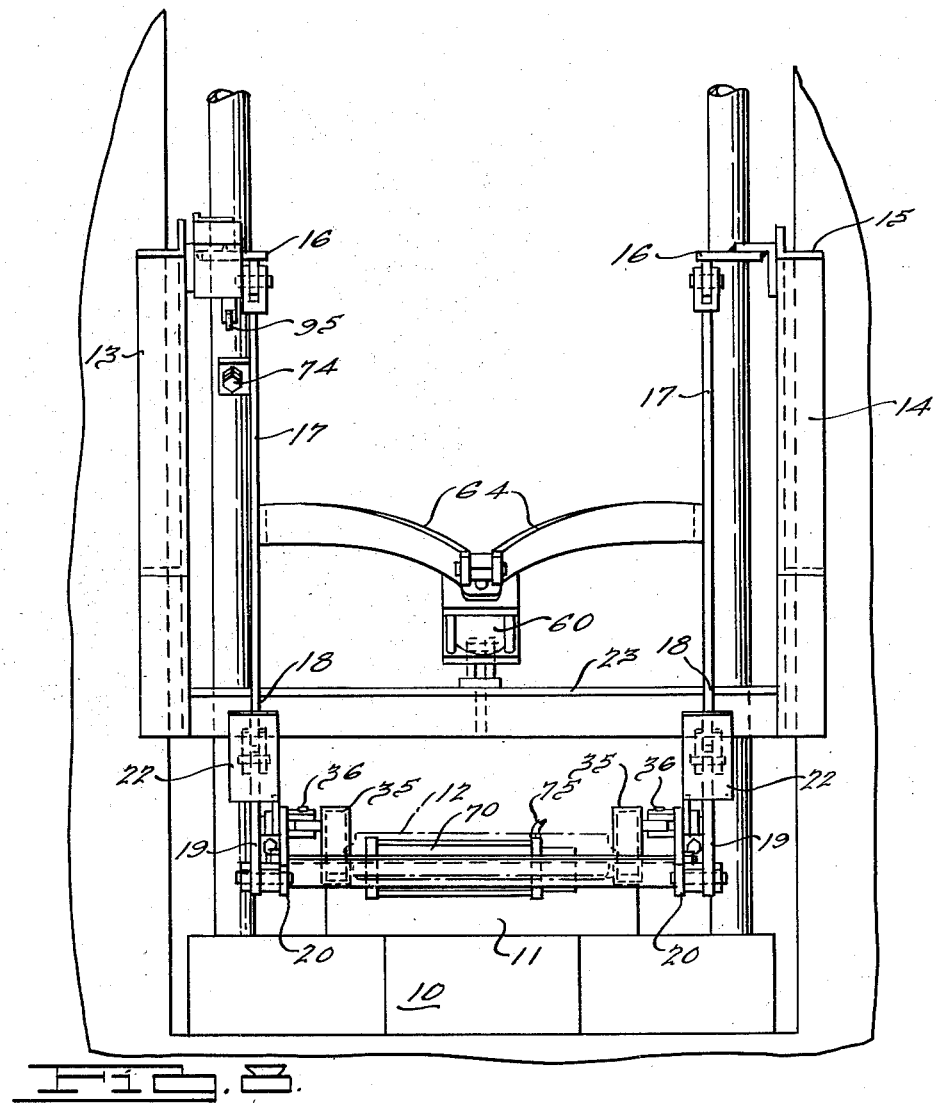
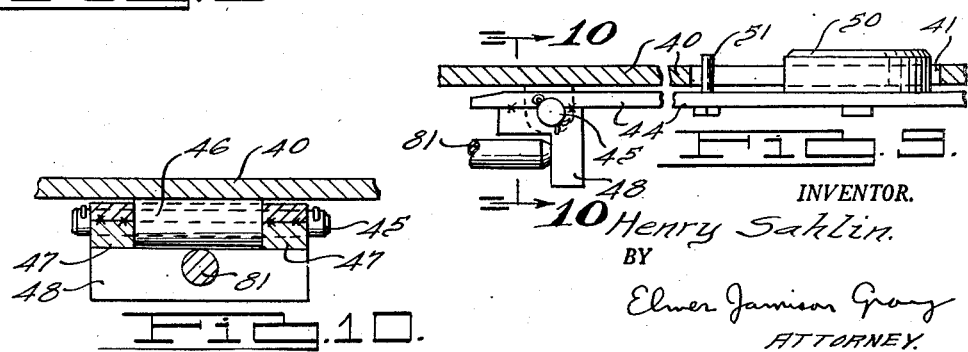
INVENTOR.
Henry Sahlin.
BY
Elmer Jamison Gray
ATTORNEY.

United States Patent Office 2,763,167
Patented Sept. 18, 1956

2,763,167

LOADING AND UNLOADING APPARATUS

Henry Sahlin, Birmingham, Mich.

Application August 8, 1952, Serial No. 303,382

7 Claims. (Cl. 78—99)

This invention relates to material handling apparatus and is particularly directed to an apparatus for loading work-pieces, such as metal stampings and the like, into a press or machine preparatory to the operations thereof and subsequently unloading such pieces, so operated upon, from the press or machine.

An object of the invention is to provide an apparatus of the above character adapted to be mounted adjacent a press or machine and provided with a shiftable carriage having work engaging means shiftable with the carriage toward and from an operative position between the press members. The apparatus is provided with means for moving the work engaging means relative to the carriage into and out of position to engage the work and also is provided with mechanism connected to the carriage and operative sequentially to swing one end of the carriage upwardly and then shift the carriage in a direction to withdraw the work engaging means and the work engaged thereby out of the press to an unloading position. The apparatus also preferably includes a second work engaging means carried by the carriage for moving work from a loading station to the work operative position between the press members upon shifting the carriage to withdraw the completed workpiece from the press.

In the use of the apparatus, for example, to load brake drums into a coining press, and subsequently unload such brake drums therefrom, a toggle mechanism is mounted adjacent one side of the press, and a pair of relatively stationary guide members are located between the press members as by having such guide members mounted upon the stationary die member of the press, the toggle mechanism and guide members in turn pivotally supporting a carriage, to which are pivoted a pair of work gripping arms having sets of article engaging elements. At the preloading station, outwardly of the press, the gripping arms are initially in an open or spread position so that a brake drum may be placed therebetween upon a gauge plug and locating pin in proper position to be subsequently carried into position to be operated upon by the die members of the press. With the parts in this position the coining or die operation is performed on the brake drum previously loaded into the die of the press. Upon completion of the die operation and separation of the die members, the gripping arms are moved inwardly to simultaneously confine the completed brake drum and grip the preloaded drum. Subsequently, the completed drum is lifted from the die member and then moved outwardly from the press by rearward movement of the carriage, simultaneously carrying the preloaded brake drum into position to be located in the press, and then dropped into its position in the lower die of the press. The carriage then returns to its starting position and the sequence repeated. Pneumatically actuated means, controlled in timed relation with respect to press operation, is preferably provided for shifting the carriage, moving the work handling means into and out of engagement with the work, and for locating a preloaded work-piece while at the preload station.

Other objects of this invention will appear in the following description and appended claims, reference being had to the accompanying drawings forming a part of this specification wherein like reference characters designate corresponding parts in the several views.

Fig. 1 is a fragmentary perspective view of a press equipped with an apparatus embodying the present invention, portions of the apparatus being broken away for clearness.

Fig. 2 is a fragmentary side elevation of the apparatus of Fig. 1 showing the carriage and associated mechanism in rest or preload position.

Fig. 3 is a fragmentary side elevation of a press illustrating the control mechanism for operating the apparatus of the invention.

Fig. 4 is an enlarged vertical section of the inner end of the main operating cylinder, showing the pneumatic time delay means.

Fig. 5 is a top plan view of the carriage mechanism of the apparatus of Fig. 1, further illustrating the locating mechanism at the preload station and the gripping mechanism at the operating station.

Fig. 6 is an enlarged fragmentary detail view taken substantially on a line 6—6 of Fig. 5.

Fig. 7 is an enlarged fragmentary detail view taken substantially on a line 7—7 of Fig. 5.

Fig. 8 is a fragmentary rear end elevation of the apparatus of the invention.

Fig. 9 is an enlarged fragmentary view of the gauge plug and locating pin and certain elements of construction shown in Fig. 2.

Fig. 10 is a detailed sectional view taken substantially on a line 9—9 of Fig. 8.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the invention is illustrated by way of example as applied to an apparatus operable to load and unload stampings, or the like, into and out of a press A, Figs. 1 and 3. The press may be of any well known type, such as a coining press, and comprises a bed 10 supporting a lower die 11. The press is also equipped with the usual vertically reciprocable ram or punch, not shown, cooperating with the die 11 to perform the desired operation on the stamping. By way of example, a partly completed article, such as a brake drum 12 is fed into and removed from the press A by the present apparatus, the supporting portions of which are suitably attached to the press at B and C. The supporting structure B, from the upper portion of which depends a toggle mechanism, comprises a pair of angle iron brackets 13 and 14 to the upper ends of which brackets 15 are fixed. Adjacent the lower ends of brackets 13 and 14 is a cross member 23 also of angle iron or the like. Brackets 15 carry pivot members 16 which pivotally support the upper links 17 of toggle arms 18 connected to comparatively short lower links 19 to which are pivotally connected the outer or rearward extremities of frame members or rails 20 of a work handling carriage indicated generally at 21. Stop plates 22 are secured to lower links 19 adjacent their pivotal connection to links 17 of toggles 18 to limit pivotal movement therebetween to one direction.

The supporting structure or guide means at C comprises plate brackets 24 removably secured to die block 11 of press A as by bolts 25. Adjacent the edges of plates 24 are vertical spacers 26 for horizontally arranged track members 27, there being a track at each side of the bed 10, as more clearly shown in Fig. 5. As shown, the tracks 27, are of angle form arranged to present an upstanding inner edge 28, upon which rollers 30 journalled on rails 20 inwardly of their forward ends are adapted to ride. In addition to supporting and guiding the carriage 21 for rolling movement on tracks 27, the rollers 30 serve as pivots for the carriage 21 when the toggle members 18 are actuated, as will hereinafter appear. At each end of the tracks 27 are adjustable stops 33 and 34 to limit movement of the carirage 21 in forward and rearward directions.

Inwardly of the rails 20 are a pair of gripper arms 35 arranged substantially parallel to but terminating short of the rearward ends of the rails 20. The forward ends of arms 35 are pivoted to the rails 20 by vertical pivot pins 36, which permit the arms to be moved from closed or gripping position to open or spread position. Supporting plates 37 are mounted on the lower edge of rails 20 toward their rearward ends and cooperate with the pivots 36 to horizontaly position the grippers 35 for movement with the rails, as will hereinafter appear.

At the preload station, outwardly of the relatively movable die members of the press, the carriage is provided with a plurality of instrumentalities for properly locating a brake drum or other article to be loaded into the press. A plate 40 of generally rectangular shape underlies this portion of the carriage and projects forwardly from and slightly above the plate brackets 24. The plate 40 has an irregular shaped opening 41 substantially centrally thereof and is supported in a generally horizontal position by a pair of cross members 42 in turn fixed to the brackets 24. To the lower face of plate 40 is pivoted one end of a gauge lever 44 as more clearly shown in Figs. 9 and 10. The lever 44 is rockable about pivot pin 45 projecting through an aperture in a depending ear 46 fixed to the plate 40 and through holes in a pair of spaced blocks 47 provided on lever 44. Adjacent the pivot 45 is a block 48 which projects downwardly from the lever 44 and serves as an actuating member or lever arm against which a force is applied to rock the lever 44. Adjacent its opposite end the lever 44 carries a gauge plug 50 and a locating pin 51 which normally project into the opening 41 in the plate 40. Upon upward movement of the gauge end of lever 44 the plug 50 and pin 51 are projected through the opening 41. In the up position of gauge lever 44 a brake drum may be placed on plate 40 so that the plug 50 projects into the center hole of the drum. At the same time the drum will be so positioned that locating pin 51 projects through one of the thread holes a plurality of which are usually provided in a circular series around the center hole in the brake drum. Thus, an article may be properly preloaded or positioned for subsequent transfer into the press to receive a die operation on a portion thereof in the desired place and at the correct distance from the center, for example. During loading of an article in this preload position the grippers 35 are in their open or spread position. To maintain the article in the proper position for transfer into the die, a pair of diametrically opposed pins 54, Fig. 7, are adjustably carried by the grippers 35 at points opposite the center of gauge plug 50. Pins 54 are arranged to engage portions of the brake drum when the arms 35 are moved to closed or gripping position. The gripper arms 35 are also provided with opposed pairs of confining fingers 56 and 57, Fig. 6, which engage the completed work-piece in the die simultaneously with the engagement of pins 54 with the preloaded article upon inward or gripping movement of the arms 35.

The various structural elements of the apparatus are welded together when convenient and unless other securing means have been indicated as, for example, when several parts are preferably removably secured together by separable means.

As hereinbefore indicated the apparatus is preferably actuated pneumatically, air cylinders being provided to control the movement of the carriage 21 to first lift the rearward and thereof and then to move the carriage bodily rearwardly. A main cylinder 60 is pivotally connected at 61 to the stationary cross member 23 of the support B while its piston rod or plunger 62 is pivoted at 63 to a bracket 64, carried by upper toggle links 17. Movement of the piston rod 62 outwardly or rearwardly causes the toggle arm to swing about its pivot to first raise the carriage 21 and then move the carriage rearwardly. The piston rod 62 is moved out by feeding air under pressure to the inner end of the cylinder through duct or pipe 65, while the rod 62 is actuated in the opposite direction to return the toggle to starting position by feeding air to the outer end of the cylinder through duct or pipe 67.

A gripper cylinder 70 is pivoted at 71 to the end of one arm 35 and is provided with a spring loaded piston (not shown) for normally holding the gripper arms 35 in their open or spread position by moving piston rod or plunger 72 outwardly through a pivoted connection 73 on the end of the other arm 35. Pressure air is fed into the cylinder through pipe 75 to move the piston against the spring and close the gripper arms.

A gauge cylinder 80 is mounted below the inner end of plate 40 and is also provided with a spring loaded piston for operating piston rod 81. Air under pressure is fed to the cylinder 80 through pipe 83 to shift piston rod 81 forwardly against lever arm 48 and thereby swing the gauge lever 44 to its up position. When pressure air is cut off from the cylinder the spring returns the piston and permits lever 44 to swing downwardly by gravity to retract the gauge plug 50 and locating pin 51.

Fig. 3 illustrates the piping and control diagram for supplying air under pressure to the various cylinders, from which it will be noted that when pressure air is caused to be introduced into pipe 67 the piston in the main cylinder 60 is held inwardly, and into pipe 83 the gauge piston and rod 81 is projected outwardly into engagement with lever arm 48 to move lever 44 into its up position. When air is introduced into cylinder 60 through pipe 65 the piston and rod 62 is moved outwardly to actuate the toggle mechanism 18. At the same time pipe 75 feeds air to gripper cylinder 70 so that piston rod 72 is moved to close the grippers 35.

The above outlined actuating mechanism is controlled by an electro-magnetically actuated pneumatic valve 76 operated in timed relation with respect to operation of the press A by means of a rotary cam switch indicated generally by the numeral 77 and mounted on a bracket 78 at the side of the press. The cams of the switch 77 are keyed to a pulley 85 and rotated therewith by means of a sprocket chain 86 driven by a similar sprocket rotating coaxially with the flywheel 87 of the press, Fig. 1. Accordingly, at a predetermined time in the press operating cycle, i. e. after completion of the stamping operation and upward withdrawal of the press plunger or ram from the die 11, a momentary electrical contact is made through the cam switch 77 to actuate a control relay in the magnetic air valve 76 and thereby connect a source of pneumatic pressure with a conduit 100 communicating with pipe lines 65 and 75. Conduit pipes 65 and 75 are connected with the inner end of cylinder 60 and forward end of gripper cylinder 70, respectively. As a result, air pressure delivered into cylinder 60 in advance of the piston therein, which rests at the inner end of cylinder 60 at the beginning and end of each cycle, will hold the piston rod 62 inward. Air pressure delivered into cylinder 80 rearward of its piston, which rests at the rearward end of cylinder 80 at the beginning and end of each cycle, will drive piston rod 81 forward.

As indicated in Fig. 4, the forward face of piston 62a is provided with a pilot 89 which fits closely within a recess 90 in the forward end closure 91. The recess 90 is in communication with pneumatic line 65 via a radial duct 92 which in turn is in communication with the cylinder 60 forward of the piston 62a through a small bore bleeder duct 93. As long as the pilot 89 is within the recess 90, air conduit 65 is substantially closed to the cylinder 60, except for the small bleeder duct 93 which conducts air slowly into the cylinder 60 to drive piston 62a slowly rearward. Upon withdrawal of pilot 89 from recess 90, conduit 65 will be in direct communication with cylinder 60 and drive the piston 62a rapidly rearward. Accordingly, after conduit 65 is connected to the pneumatic pressure source through conduit 100, rapid rearward movement of piston 62a will be delayed for a predetermined interval of time during which pilot 89 moves out of the recess 90. During this time, however, duct 75, connected in parallel with duct 65, will immediately discharge into the end of cylinder 70 causing piston rod 72 to be immediately shifted by virtue of air discharging into the end of cylinder 70 through duct 75. Thus, by reason of the above described delayed action, no appreciable rearward movement of piston 62a will occur before the work gripping jaws 35 have been shifted by piston rod 72 into position to grip the work 12. The size of the bleeder duct 93 is determined so that as soon as the work 12 is gripped the pilot 89 will have been withdrawn from the socket 90. The piston 62a will then be forced rapidly rearward, swinging the carriage and gripper assembly 21 with the gripped drum 12 upward and shifting the same rearward as described above.

At the desired rearward limit of the stroke of the plunger 62, one of the toggle members 17 will engage and trip through an adjustable set screw 74, an actuating arm 95 of a limit switch 96 suitably mounted on a bracket 15 to which the toggle mechanism 18 is secured. Tripping limit switch arm 95 will in turn actuate the control relay valve 76 to connect conduit 101 with the pressure air source and thereby apply pressure to the rear end of cylinder 60 through conduit 67 and to the forward end of cylinder 80 through conduit 83. Thereafter the plunger 62 is rapidly moved forward so as to return the mechanism to the starting position of Fig. 2 for the next cycle of operation.

The operation of the apparatus and control is as follows:

Assume the mechanism to be in what may be termed a rest position as shown in full lines in Figs. 1 and 2. During this time, while the press or coining operation takes place, pressure air is maintained in conduit 101 and branch pipes 67 and 83 leading respectively to the outer end of the main cylinder 60 and to the gauge cylinder 80. As a result, the air delivered to cylinder 60 holds the piston and its piston rod 62 in its forward position, as shown in Fig. 2 and the air delivered into gauge cylinder 80 holds the gauge piston and its rod 81 out to maintain the gauge lever 44 in its up position. As the gripper operating piston is here spring loaded in a direction to hold the gripper arms 35 open, the brake drum 12 within the press is free to receive the coining or other die operation.

Upon completion of the die operation the press opens and the ram moves upwardly. On the upstroke of the ram the main press limit switch is actuated by cam switch 77 to actuate the magnetic air valve 76 to cause the pressure air to be introduced into conduits 100, 65 and 75. Pipe 65 leads to the inner end of the main cylinder 60 and pipe 75 leads to and introduces air into the gripper actuating cylinder 70. At this time air is exhausted from pipe 83 to the gauge cylinder 80 permitting the lever 44 to drop by reason of the withdrawal of the piston by spring action thereby withdrawing piston rod 81. When air is introduced into pipes 65 and 75 the gripper actuating cylinder 70 will operate just ahead of the main cylinder 60 due to the restriction or cushion at the inner end of the main cylinder 60 which delays action of the piston therein. By means of this delayed action of the main cylinder 60, the gripper cylinder piston 72 will first draw the gripper arms 35 together to grip the preloaded work-piece and confine the finished work-piece. Sequentially the main cylinder piston 60 is shifted outwardly thereby breaking the toggle 18 which first lifts the carriage 21 to raise the completed work-piece out of the die 11 after which the carriage 21 is shifted through further operation of the toggle links rearwardly to unload the completed drum 12 and at the same time move the preloaded drum into the press. At the end of the travel of the carriage rearwardly to unloading position the rollers 30 on the carriage 21 ride down the cam portions 31 of the tracks 27 and engage stops 34. In this position the preloaded drum is in loading position directly above the die. Also at this time the upper toggle link 17 through its adjustable set screw 74 actuates limit switch 96 which in turn operates the magnetic air valve 76 to again introduce air into conduit 100. This relieves the pressure from the gripper cylinder piston 72 and being spring loaded to spread the gripper arms 35, the latter drop a completed drum outwardly of the press and simultaneously drop the preloaded drum into the lower die. As air is again supplied to the outer end of the main cylinder 60, the piston moves inwardly returning the toggle 18 and thus the carriage 21 to starting or rest position.

Although in the embodiment, herein illustrated, the pistons in cylinders 70 and 80 are spring loaded in one direction, it will be understood that the spring may be dispensed with and air under pressure alternately introduced into opposite ends of the cylinder to shift the pistons in opposite directions and thereby perform the operations above described. Moreover, where the pistons in cylinders 70 and 80 are designed to be shifted in one direction by pressure air and in the opposite direction by springs, it will be understood that these operations by pressure air and spring action may be reversed.

I claim:

1. In a material handling apparatus for a press having relatively movable upper and lower die members, toggle mechanism adapted to be mounted adjacent the press, fixed guide means also adapted to be mounted generally horizontally adjacent the press, a carriage pivotally supported by said toggle mechanism and said guide means for movement along said guide means toward and from said die members, work engaging members movable with and with respect to said carriage, means to move said members with respect to said carriage, said members being provided with spaced apart means to engage an article to be unloaded from the press and an article to be loaded into the press, respectively, said toggle mechanism comprising a pair of toggle members pivotally connected together at adjacent ends and having vertically spaced outer ends, the outer end of one of said toggle members being fixed and the outer end of the other toggle member being connected to said carriage, fluid actuated means to operate said toggle mechanism to swing said carriage upwardly and move the same rearwardly along said guide means to a loading position, and means to control the operation of said fluid actuated means.

2. In a material handling apparatus for a press having relatively movable upper and lower die members, toggle mechanism adapted to be mounted adjacent the press, generally horizontal guide means also adapted to be mounted adjacent the press, a carriage pivotally supported by said toggle mechanism and said guide means for movement along said guide means toward and from said die members, work handling members mounted on said carriage for movement to open and closed positions, means to move said members to engage an article to be unloaded from the press and an article to be loaded into the press, respectively, said toggle mechanism comprising a pair of toggle members pivotally connected together at adjacent ends and having vertically spaced outer ends, the outer end of one of said toggle members being fixed and the outer end of the other toggle member being connected to said carriage, means to operate said toggle mechanism to move said carriage upwardly and outwardly to unload an article from the press and load an article into the press, and means to control the operation of said power means.

3. In a material handling apparatus for a press having relatively movable die members, toggle mechanism mounted adjacent the press, guide means also mounted adjacent the press, a carriage pivotally supported by said toggle mechanism and said guide means in a generally horizontal position between the relatively movable die members of the press, gripper elements movable with and with respect to said carriage, fluid actuated means to move said gripper elements with respect to said carriage, said gripper elements being provided with spaced apart means to engage an article to be unloaded from the press and the prelocated article to be loaded into the press, respectively, said toggle mechanism comprising a pair of toggle members pivotally connected together at adjacent ends and having vertically spaced outer ends, the outer end of one of said toggle members being fixed and the outer end of the other toggle member being connected to said carriage adjacent one end of the latter, fluid actuated means to operate said toggle mechanism to raise said one end of said carriage upwardly and move said carriage outwardly to unload an article from the press and sequentially load an article into the press, co-operating cam means on said guide means and carriage to lower the loaded article into a die member of the press, and means to control the operation of said fluid actuated means.

4. In a material handling apparatus for a press having relatively movable upper and lower press members, carriage guide means associated with said press, a carriage having a guide engaging pivot element adapted to ride along said guide means, spaced work engaging members pivotally mounted on said carriage for movement toward and from each other, means for moving said members toward each other to engage the work and away from each other to release the work, and mechanism connected to said carriage at a location spaced from said element for shifting said carriage in one direction or the opposite along said guide means and also for swinging said carriage about said pivot element toward and from said guide means upon shifting of said carriage in said one direction or the opposite respectively.

5. A material handling apparatus according to claim 4 wherein the means for shifting and swinging said carriage comprises toggle means having one outer end fixed and having the other outer end connected to said carriage at said location.

6. In a material handling apparatus for a press having relatively movable upper and lower press members, generally horizontal carriage guide means associated with said press, a carriage having a guide engaging pivot element adjacent one end adapted to ride along said guide means, said carriage being shiftable along said guide means between said press members, spaced work engaging members pivotally mounted on said carriage for movement toward and from each other, means for moving said members toward each other to engage the work and away from each other to release the work, and mechanism connected to said carriage adjacent its other end to support the latter, said mechanism being effective to shift said carriage in one direction or the opposite along said guide means and simultaneously to swing said other end upwardly or downwardly respectively.

7. A material handling apparatus according to claim 6 wherein the means for shifting and swinging said carriage comprises a pair of toggle links pivotally connected together at adjacent ends, one of said toggle links having a fixed outer end spaced vertically from said guide means, the other of said toggle links having a swinging outer end conected to said carriage adjacent said other end of the latter.

References Cited in the file of this patent

UNITED STATES PATENTS

| 1,996,818 | Marshall et al. | Apr. 9, 1935 |
| 2,013,858 | Lawlor | Sept. 10, 1935 |
| 2,382,339 | Showron et al. | Aug. 14, 1945 |
| 2,609,776 | Sahlin | Sept. 9, 1952 |